United States Patent [19]

Chang et al.

[11] Patent Number: 4,533,857
[45] Date of Patent: Aug. 6, 1985

[54] ELECTRICAL ENERGY SAVING DEVICE FOR MOTORS

[76] Inventors: Ten-Ho Chang; Shin-Yih Wang, both of 18, Alley 9, Lane 75, Chia-Shu North Rd., Chang-Hua City, Taiwan

[21] Appl. No.: 413,394

[22] Filed: Aug. 31, 1982

[51] Int. Cl.³ ............................ H02P 5/16; H02P 5/40
[52] U.S. Cl. .............................. 318/345 A; 318/345 H; 318/729
[58] Field of Search ............ 318/729, 345 H, 345 D, 318/345 A

[56] References Cited

U.S. PATENT DOCUMENTS

| | | | |
|---|---|---|---|
| 3,539,892 | 11/1970 | Lindberg | 318/345 H |
| 3,742,337 | 6/1973 | Digneffe | 318/345 D |
| 3,875,485 | 4/1975 | Hornung | 318/345 D |
| 4,078,393 | 3/1978 | Wills | 318/806 |
| 4,243,926 | 1/1981 | Phillips | 318/798 |
| 4,266,177 | 5/1981 | Nola | 318/810 |
| 4,384,243 | 5/1983 | Muskovac | 318/729 |
| 4,392,093 | 7/1983 | Paule et al. | 318/345 H |

Primary Examiner—David Smith, Jr.
Attorney, Agent, or Firm—Saidman, Sterne, Kessler & Goldstein

[57] ABSTRACT

An electrical energy saving device for motors comprises in combination a principal circuit system and an associated control circuit system. The principal circuit system includes an input power source, a transducer unit, a load, and a triggering device. The control circuit system includes a signal amplifying unit, a feedback unit, a working-point adjusting and indicating unit, a rectifying and filtering unit, a photoelectric coupling unit, an overload protecting unit, and a delay protecting unit. The control circuit system can automatically detect the load state of the motor and develop a signal through the system to adjust the working-point voltage for enabling the triggering device of the principal circuit system to automatically adjust the firing angle so that the proper magnitude of the input voltage and current are effectively provided to the motor in accordance with its different load states. This operation results in electrical energy being economically consumed and the power factor of the system being effectively controlled.

22 Claims, 5 Drawing Figures

α: FIRING ANGLE
θ: CONDUCTION ANGLE

ELECTRICAL ENERGY SAVING DEVICE FOR MOTORS

BACKGROUND OF THE INVENTION

1. Field of the Invention

This invention relates to an electrical energy saving device for motors, which comprises a principal circuit system operating with a control circuit system for automatically adjusting the magnitude of the input power of the motor with respect to the different load states of the motor.

2. Related Art

Conventionally, all motor control systems have not been provided with a specially designed triggering device for controlling the conducting condition of the motor. Therefore, when the motor is in an idle running state or the load thereof is light, the input current drawn by the motor is still kept at 50–70% of the full-load current. This mode of operation not only consumes too much energy and reduces the power factor of the system, but also decreases the life span of the motor because of the high temperature suffered by the motor when running at this current level.

Although control elements, such as a SCR or a TRIAC, are used in conventional motor control circuits for triggering the running state of the motor, owing to the fact that the magnitude of the starting current is usually 7–8 times of the zero-load current, the specifications of such control elements must be augmented, which causes a significant increase in the manufacturing costs. On the other hand, a timing device is also used in conventional control circuit as a starting and overload protecting device, but it has to be matched with an electromagnetic switch, which increases substantially the volume of the control device as well as the manufacturing costs. Besides, the timing device, which achieves an overload protection only during the starting period, provides no protection during the running state of the motor. Furthermore, conventional motor control circuit systems cannot be installed at the front end of the power source switch, and are very inconvenient in utilization, replacement and adjustment operations.

SUMMARY OF THE INVENTION

The primary object of this invention is to provide an electrical energy saving device for motors having a principal circuit system used with a control circuit system, which automatically adjust the magnitude of the voltage and current of the motor in accordance with different load states thereof so as to achieve electrical energy saving and power factor control.

Another object of this invention is to provide for motors an electrical energy saving device having an overload protecting circuit for ensuring safe tripping of the staring current and the over current without impairing the control elements in order to decrease the specifications of such control elements, to reduce the manufacturing costs, and to decrease the volume of the control circuit system.

Still another object of this invention is to provide an electrical energy saving device for motors, which device can be installed in front of the power source switch for facilitating the operations of replacement and adjustment.

According to this invention, these and other objects are achieved by providing an electrical energy saving device for motors, which device comprises a principal circuit system and an associated control circuit system. The principal circuit system includes an input power source, a transducer unit, a load, and a triggering device stage, while the control circuit system includes a signal amplifying unit, a feedback unit, a working-point adjusting and indicating unit, a rectifying and filtering unit, a photoelectric coupling unit, an overload protecting unit, a phase control unit, and a delay protecting unit. When the principal circuit system is in a running state, the control circuit system can automatically detect the load state thereof, and develop a signal through the system to adjust the working-point voltage of the phase control unit for enabling the triggering device of the principal circuit system to automatically adjust the firing angle along with the magnitudes of the load state for economically consuming the electrical energy and practically promoting the power factor of the control system. In addition, an overload protecting unit is incoporated into the system for preventing the triggering device thereof from suffering the shock of the over-current incurred in the system.

Other objects, advantages and salient features of this invention will become apparent from the following detailed description, which discloses a preferred embodiment of the present invention with reference to the annexed drawings.

DETAILED DESCRIPTION OF THE PREFERRED EMBODIMENT

Figure 1:
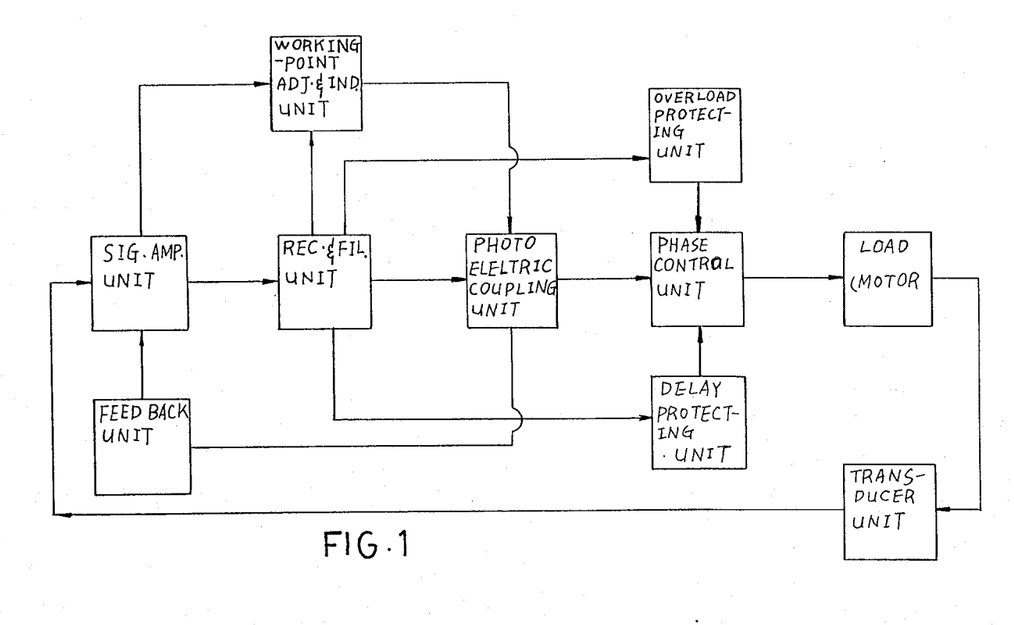
FIG. 1 is a block diagram of an electrical energy saving device for motors embodying this invention.

Referring to the block diagram of FIG. 1, shown is a preferred embodiment of an electrical energy saving device for motors according to this invention, which comprises in combination two major systems—a principal circuit system and a control circuit system. The principal circuit system includes an input power source (not shown), a transducer unit, a load (motor), and a triggering device stage (not shown). The control circuit system includes a signal amplifying unit, a feedback unit, a working-point adjusting and indicating unit, a rectifying and filtering unit, a photoelectric coupling unit, an overload protecting unit, a phase control unit, and a delay protecting unit.

When the load (i.e., motor) of the principal circuit system is in a running state, a dynamic signal indicative thereof will be transfered to the control circuit system by the transducer unit. This dynamic signal is fed to the signal amplifying unit for amplification and the amplified signal is supplied to the rectifying and filtering unit for rectification and filtering. This rectified signal is provided to the photoelectric coupling unit for conversion processing, and the rectified signal at the output of the photoelectric coupling unit is used to directly drive the phase control unit, which uses it to actuate the triggering device to automatically adjust the magnitude of the firing angle along with the signal of the load state for further adjusting the running power of the major thereof. Moreover, by means of the working-point adjusting and indicating unit, the working-point voltage can be set for establishing the most favorable potential, and, by means of the feedback unit, the adjusted working-point voltage can be maintained at a constant state thereat. In addition, the overload protecting unit is used for preventing the whole system from suffering the shock of the over-load current thereof and also for reducing the using specification and volume of the triggering device.

Figure 2:
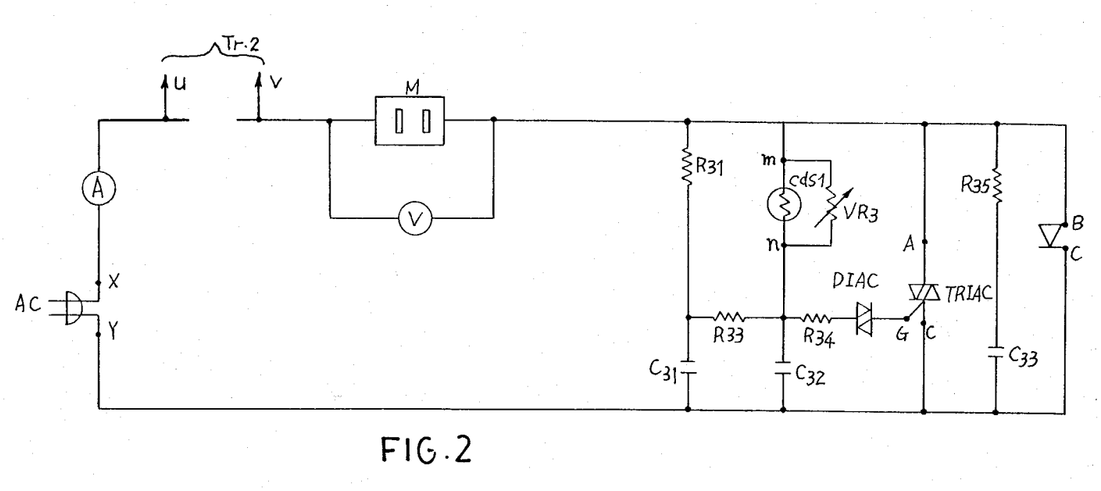
FIG. 2 is a circuit diagram of a principal circuit system according to this invention.

The circuit diagram of the principal circuit system, shown in FIG. 2, includes an input power source (labelled AC), a transducer unit not shown but indicated by reference Tr. 2), a load M, and a triggering device stage. One node U of the transducer unit Tr. 2 is connected to a terminal X of the power source, and the other node V to one side of the load M, of which the other side of load M is coupled to the triggering device stage through a node m of a photosensitive resistor $CdS_1$ thereof. The triggering device stage further comprises a DIAC, a TRIAC, a pair of demagnetizing points B and C of a relay unit arranged thereto, and some necessary resistors and capacitors electrically coupled therewith. A node n of the photosensitive resistor $CdS_1$ is connected via a resistor $R_{34}$ to one side of the DIAC; the other side of the DIAC is coupled with a gate G of the TRIAC, whose anode A and cathode C are respectively connected in parallel with the demagnetizing points B and C of the relay unit arranged in the control circuit system.

Figures 3, 4:
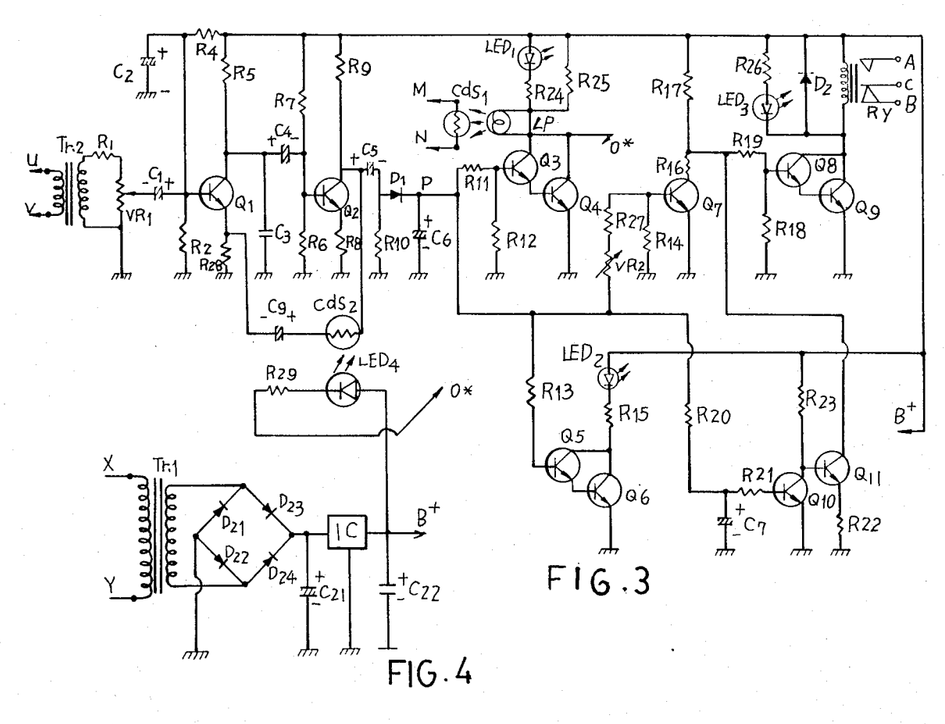
FIG. 3 is a circuit diagram of a control circuit system according to this invention.
FIG. 4 is a circuit diagram of a power supply unit matched between the principal circuit system of FIG. 2 and the control circuit system of FIG. 3.

A detailed circuit diagram of the control circuit system of the preferred embodiment according to this invention is shown in FIG. 3, wherein the main components include the signal amplifying unit, the feedback unit, the rectifying and filtering unit, the photoelectric coupling unit, the working-point adjusting and indicating unit, the overload protecting unit, and the delay protecting unit.

The input signal coming from the transducer unit of the principal circuit system through the nodes U and V (see FIG. 2) is picked up by the control circuit system by means of a transformer $Tr_2$ coupled with the signal amplifying unit, which include a pair of transistors $Q_1$ and $Q_2$ electrically connected therein and a plurality of associated resistors and capacitors electrically coupled therewith. Specifically, the base of the transistor $Q_1$ is connected to a variable resistor $VR_1$ connected across the secondary winding of the transformer $Tr_2$, the emitter is connected to ground through a resistor $R_{28}$, and the collector is connected to the base of the transistor $Q_2$ through a capacitor $C_4$ and two parallel-connected resistors $R_5$ and $R_7$.

The feedback unit, which mainly includes a polar capacitor $C_9$ and a photosensitive resistor $CdS_2$, is connected to the signal amplifying unit by connecting one end of the $CdS_2$ to the collector of the transistor $Q_2$ and by connecting the negative side of the capacitor $C_9$ to the emitter of the transistor $Q_1$.

The rectifying and filtering unit, which comprises a diode $D_1$ and two capacitors $C_5$ and $C_6$, is connected to the signal amplifying unit and the feedback unit through the positive side of the capacitor $C_5$ at one node, and is coupled with the photoelectric coupling unit at a node P.

The photoelectric coupling unit includes a Darlington amplifier $Q_3$, $Q_4$, a lamp LP, a (red) indicator $LED_1$, and associated resistors. Node P is connected to the base of the transistor $Q_3$. In this connection, the light source of the lamp LP is arranged to be sensed by the photosensitive resistor $CdS_1$ of the principal circuit system (see FIG. 1), and the red indicator $LED_1$ will indicate the conducting state of the control circuit system.

The working-point adjusting and indicating unit, which includes a darlington amplifier $Q_5$, $Q_6$ and a yellow indicator $LED_2$, is effectively connected at the base of the transistor $Q_5$ to the base of the transistor $Q_3$ of the photoelectric coupling unit. The cathode of the yellow indicator $LED_2$ is connected via a resistor $R_{15}$ to the emitters of the transistors $Q_5$ and $Q_6$ for indicating the normal state of the working-point voltage thereof.

The overload protecting unit includes a PNP transistor $Q_7$, a Darlington amplifier $Q_8$, $Q_9$, a relay RY having a plurality of contacting points A, B, C, a green indicator $LED_3$, and associated components. The base of the transistor $Q_7$ is effectively connected to the base of transistor $Q_3$ (of the photoelectric coupling unit) and to the base of transistor $Q_5$ (of the working point adjusting and indicating unit) through a variable resistor $VR_2$; the emitter of transistor $Q_7$ is connected to the ground, and collector is connected to the base of the Darlington transistor $Q_8$. The cathode of the green indicator $LED_3$ is connected to the collectors of transistors $Q_8$ and $Q_9$. One side of the relay coil of the relay RY is connected via resistor $R_{26}$ to the anode of the $LED_3$ and the other side to the collectors of the transistors $Q_8$ and $Q_9$. Note that, the contacting points A, C of the relay RY are the exciting points and the points B, C are the demagnetizing points of the triggering device stage of the principal circuit system (see FIG. 2).

A power supply circuit of the control circuit system is shown in FIG. 4, wherein the secondary winding of the transformer $Tr_1$ is coupled with a bridge-rectifier circuit, of which a first common output node is grounded and the other common output node connected to a pair of rectifying capacitors $C_{21}$ and $C_{22}$. The positive terminal of $C_{22}$ is connected to the anode terminal of a yellow indicator $LED_4$, of which the cathode terminal is coupled with the photoelectric coupling unit through the collectors of the Darlington transistors $Q_3$, $Q_4$ so as to directly respond to the illumination level of the lamp LP thereof.

The operational principle of the preferred embodiment according to this invention is as follows:

Referring now to FIGS. 2, 3, and 4, when the load (motor) of the principal circuit system is zero or in an idling state, the current drawn by the load is low so that the signals produced at the nodes U and V of the transducer unit indicative of this current are also low. After these low level signals are picked up and amplified by the signal amplifying unit and then filtered by the rectifying and filtering unit of the control circuit system, a DC voltage $V_p$ will appear at the node P. Since these amplified signals are at a low level due to the zero load or idling state in the system, the DC voltage value appearing at node P will be too small to energize the Darlington amplifier $Q_3$, $Q_4$. Since Darlington amplifier $Q_3$, $Q_4$ is off, the lamp LP will not be lighted (or on), and consequently, the resistance exhibited by the photosensitive resistor $CdS_1$ in the principal circuit will be very high. As a result, the firing angle $\alpha$ (see FIG. 2) of the TRIAC in the triggering device stage is increased while the conduction angle $\theta$ thereof is correspondingly decreased, and, henceforth, the terminal voltage and current of the load (motor) is reduced. This operation results in economical consumption of electrical power by the load.

When the load (motor) of the principal circuit system is high, the level of the signal at nodes U and V of the transducer unit will be at a correspondingly high level. This signal after being amplified and filtered by the control circuit system, will be the DC voltage $V_p$ appearing at the node P, which now will be high enough to turn on the Darlington amplifier $Q_3$, $Q_4$. With Darlington amplifier $Q_3$, $Q_4$ on, lamp LP will be lighted, and the resistance exhibited by the photosensitive resistor $CdS_1$ will be reduced. Consequently, the firing angle $\alpha$ of the TRIAC is decreased while the conduction angle $\theta$ increased, and the terminal voltage and current to the load are effectively increased so that proper operation is achieved.

For the case of an over-current appearing in the input of the system, in order to prevent the TRIAC from being burnt out, the voltage present at the node P can be set at a level that it will not energize the Darlington amplifier $Q_8$, $Q_9$ of the overload protecting unit causing the relay not to switch so that denagnetizing points B and C are in contact. When this occurs, the over-load current appearing in the principal circuit system will just flow through the loop formed by the points B and C of the relay RY without flowing through and damaging the TRIAC, thereby effecting overload protection of the TRIAC.

Figure 5:
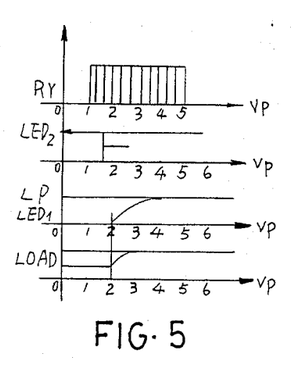
FIG. 5 is an operational illustration of the preferred embodiment according to this invention.

Referring to FIG. 5, an operational illustration of the preferred embodiment according to this invention indicates that, if this device is required to operate in accordance with a logic sequence, (assuming that the output voltage $V_p$ at the node P of the rectifying and filtering unit is set through an adjustment which can be made by adjusting the variable resistor $VR_1$) the working-point voltages obtained therefrom will generally fall into three levels as follows:

The voltage of the first level is $V_p<1$ V. At this stage, the TRIAC of the triggering device stage in the principal circuit system will not operate;

The voltage of the second level is $1 \leq V_p < 5V$, which is the operational range of the TRIAC; and The voltage of the third level is $V_p<5$ V. In this level, the TRIAC will also not operate.

Therefore, when the system is not operating in the normal load state, which results in the voltage level at the node P as being $V_p<1$ V, the transistor $Q_{10}$ of the delay protecting unit in the control circuit system will be cut off, which results in a high potential appearing at its collector, which cauuses the transistor $Q_{11}$ to be turned on. With transistor $Q_{11}$ on, a low potential appears at its collector, causing the Darlington transistors $Q_8$, $Q_9$ of the overload protecting unit to be cut off. Meanwhile, the high potential at the collectors of $Q_8$ and $Q_9$ will make the relay RY restore to the unenergized state (as shown in FIG. 4), whereby the demagnetizing points B and C by-pass the triggering device of the principal circuit system. On the other hand, since the lamp LP of the photoelectric coupling unit is not in an illuminating state, the resistance of $CdS_1$ is too high to energize the TRIAC of the triggering device stage of the principal circuit system.

When the motor is in idling state, the variable resistor $VR_1$ will be adjusted beforehand to make the voltage $V_p$ at the node P to rise to a level of about 1.6–1.8 VDC; at this level, the Darlington transistors $Q_5$, $Q_6$ of the working-point adjusting and indicating unit will be turned on, and the yellow indicator $LED_2$ will be illuminating so as to show that the firing angle $\alpha$ of the TRIAC of the triggering device stage of the principal circuit system is closing or triggering at a state of 90°–100°, thus presenting a favorable working-point voltage. At this stage, and the variable resistor $VR_1$ can be fixed at this level, the transistor $Q_{10}$ of the delay protecting unit is turned on, leaving its collector in a state of negative potential capable of cutting off the transistor $Q_{11}$. With transistor $Q_{11}$ off, the high potential appearing at its collector will turn on the Darlington transistors $Q_8$, $Q_9$ of the overload protecting unit. In the meantime, the low potential state at the collectors of $Q_8$ and $Q_9$ will make relay RY switched to the state where exciting points A and C and in contact. At the same time, the Darlington transistors $Q_3$, $Q_4$ of the photoelectric coupling unit will also be turned on, and the lamp LP gradually illuminates, causing the resistance of the photosensitive resistor $CdS_1$ to be reduced by degrees. Consequently, the TRIAC of the triggering device stage of the principal circuit system starts to perform the operations of triggering and conduction.

When the load of the motor is steadily increasing, the signal strength at the output of the transducer unit will also be growing; therefore, the voltage at the node P rises and drives the Darlington transistors $Q_3$, $Q_4$ to increase the amplified signals therefrom, causing the resistance of the photosensitive resistor $CdS_1$ to make a further decrease; this causes the firing angle $\alpha$ of the TRIAC to be reduced while the conduction angle $\theta$ to be correspondingly increased, effecting automatic adjustment thereat which follows the magnitude of the load state of the motor. Moreover, owing to the fact that the adjustment of the variable resistor $VR_2$ is not in excess of 5 V, the transistor $Q_7$ of the overload protecting unit remains at cut-off state while the transistors $Q_8$ and $Q_9$ are still in a ON state, causing the relay RY to be kept at the state of exciting points A and C being in contact.

When an over-current condition appears in the system and causes a voltage level at node P to be in a state of $V_p>5$ V, the transistor $Q_7$ of the overload protecting unit will be turned on, developing a low potential across the collector of the transistor $Q_7$ so that the Darlington amplifier $Q_8$, $Q_9$ is cut off, making the relay RY restoring to the unenergized state where demagnetizing points B and C are in contact. Consequently the over-current that is present is shunted from the TRIAC of the triggering device of the principal circuit system through a by-pass formed thereat, thereby effecting the protection operation of the TRIAC.

According to the preferred embodiment of this invention, when the power source switch is turned on, a great surge of current will be instantaneously drawn by the load, making the voltage at the node P as being $V_p>5$ V. When the load becoming stable, the voltage at node P will return to the state between 1 V–5 V. In order to avoid causing the relay RY to transfer between the points B⟵⟶A during this short time duration, which would reduce the life span of the TRIAC element and/or produce an undesirable impulse in the system, a capacitor $C_7$ and the pair of transsistors $Q_{10}$ and $Q_{11}$ of the delay protecting unit act to eliminate the instantaneous skip transfer operation and to maintain the system in normal operation. With the exception of the matched operations of the transistor $Q_{11}$, (which is turned on only when $V_p<1$ V) and of transistors $Q_8$ and $Q_9$ (which are turned on only when $V_p>5$ V), the working voltage is always kept in the range of $1V < V_p < 5V$ for performing normal operation.

Furthermore, according to the preferred embodiment of this invention, when a load is added to the system, the following sequence occurs in the operation of the system:

$$I_L \uparrow \to V_{uv} \uparrow \to V_p \uparrow \to V_{lamp} \uparrow \to R_{cdsl} \downarrow \to \alpha \downarrow \to \theta \uparrow \to V_{load} \uparrow \to I_L$$

This positive feedback relationship, caused by the rising of the line current due to the addition of the load, is not linear so that it will affect, more or less, the stability of the circuit working-point voltage. However, with the feedback unit provided in the control circuit system, this problem of positive current increase is solved by the negative feedback signals produced therefrom, and the working-point voltage of the system can always be kept at an adjustable stability in accordance with the load of different types of motors that can be used. Therefore, when the illumination of the lamp LP in the control circuit is intensifying due to the increase of the load thereof, the brighness of the indicator LED$_4$ in the feedback unit will also increase, causing the resistance of the photosensitive resistor CdS$_2$ to decrease; therefore, the current rising phenomenon at the node P is offset, and the stability of the working-point voltage always adjustably maintained thereat.

While a preferred embodiment has be chosen and described, it will be apparent that many changes may be made in the general construction and arrangement of this invention without departing from the spirit and scope thereof, and it is therefore desired that this invention be not limited to the exact disclosure, but only to the extent of the appended claims.

What we claim is:

1. An electrical energy saving device for motors, which comprises:
   (a) principal means comprising,
      (i) transducer means connected between the input power source and the motor for providing a signal indicative of the electric power being utilized by the motor; and
      (ii) triggering device means connected between the input power source and the motor for providing the electric power to the motor in response to receipt of a triggering signal;
   (b) control means, connected to the input power source, said transducer means and said triggering device means, for providing said triggering signal to said triggering device means so that the optimal amount of the electric power is provided to the motor, where said triggering signal is generated in accordance with the signal of said transducer means which is reduced when the motor is operating in the normal range by a negative feedback signal indicative of the electric power supplied by the power source, wherein said control means further comprises:
   (c) a power supply means;
   (d) a signal amplifying means associated with said transducer means of said principal means;
   (e) feedback means electrically connected to said signal amplifying means and said power supply means for providing negative feedback signals to said signal amplifying means;
   (f) rectifying and filtering means coupled with said signal amplifying means and said feedback unit means;
   (g) photoelectric coupling means electrically connected to said rectifying and filtering means with respect to said signal amplifying means;
   (h) working-point adjusting and indicating means electrically connected to said photoelectric coupling means and said rectifying and filtering means;
   (i) overload protecting means coupled with said working-point adjusting and indicating means and said photoelectric coupling means; and
   (j) delay protecting means coupled with said overload protecting means and said photoelectric coupling means.

2. The electrical energy saving device for motors as claimed in claim 1, wherein said feedback means comprises a polar capacitor and a photosensitive resistor characterized in that resistance reduction of said photosensitive resistor with respect to increased current of said power supply means is used to provide a negative feedback signal to said signal amplifying means for maintaining the stability of the working-point voltage.

3. The electrical energy saving device for motors as claimed in claim 1, wherein said rectifying and filtering means is characterized by a node, the voltage at which can be adjusted for controlling the logic operations of said control means.

4. The electrical energy saving device for motors as claimed in claim 1, wherein said photoelectric coupling means further comprises Darlington amplifier means matched with a lamp and an LED indicator for controlling the firing angle condition of said triggering device means in said principal means and for indicating the normal state of the load of the motor.

5. The electrical energy saving device for motors as claimed in claim 1, wherein said working-point adjusting and indicating means further comprises Darlington amplifier means coupled with an LED indicator for presenting a favorable working-point voltage when the motor is in an idling state and the firing angle of said triggering device means in said principal means is occurring in the range of 90°–100°.

6. The electrical energy saving device for motors as claimed in claim 1, wherein said overload protecting means further comprises Darlington amplifier means electrically coupled with relay means having exciting and demagnetizing points, an LED indicator, and a PNP transistor, so that, when an over-current state of the electric power utilized by the motor occurs, said Darlington amplifier means is cut off and said relay means is restored to the state such that the demagnetizing points are in contact for providing a by-pass to said triggering device means of said principal means in order to achieve overload protection of said triggering device means.

7. The electrical energy saving device for motors as claimed in claim 1, wherein said delay protecting means is characterized in that it is operable only when low power is utilized by the motor for matching it with said overload protecting means, which is operable only when high power is utilized by the motor, so as to maintain the system always in normal operational condition between low power level and the high potential level, and to effect the protection of the triggering device means between these two levels.

8. An electronic controller to control the amount of AC electric power from a power source provided to an AC induction motor, which controller comprises:
  (a) transducer means having an input for providing a first output signal indicative of the signal level at said input;
  (b) a TRIAC having an anode, a cathode, and a grate, said anode and cathode connected across a series circuit comprising the power source, said input of said transducer means, and the motor;
  (c) triggering means connected to said gate for supplying a triggering signal to said gate as a function of the level of a first input signal;
  (f) signal amplifying means connected to said transducer means for producing a second output signal as a function of the amplification of said first output signal;
  (e) power supply means having an input connected across the power source for producing a third output signal as a function of the electric power provided to the motor during normal operation;
  (f) negative feedback means connected to said amplifying means and to said power supply means for reducing the amplification of the signal amplifying means during normal opeation of the motor as a function of an increase in said third output signal; and
  (g) coupling means connected to signal amplifying means for supplying said first input signal to said triggering means at a level determined by the level of the second output signal.

9. The controller of claim 8, wherein said coupling means comprises a light-generating means for generating said first input signal in the form of light having an intensity determined by the level of the second output signal.

10. The controller of claim 9, wherein said coupling means comprises:
  (a) an LED having a first side and a second side, said first side connected to said power supply means to receive said third output signal;
  (b) a lamp having a first lead and a second lead, said first lead connected to said second side of said LED; and
  (c) Darlington amplifier means, having an input connected to said signal amplifying means to receive said second output signal and having an output connected to said second lead of said lamp, for controlling the light generated by said LED and said lamp in accordance with the level of said second output signal.

11. The controller of claim 9, wherein said triggering means comprises:
  (a) a photo-resistor means responsive to the light from said light-generating means for providing a first signal having a level proportional to the intensity of the light; and
  (b) a DIAC having a first side connected to said photo-resistor means to receive said first signal and having a second side connected to said gate to supply said triggering signal when said first signal exceeds a predetermined firing level.

12. The controller of claim 8, wherein said power supply means comprises:
  (a) a transformer having a primary winding and a secondary winding, said primary winding connected across the power source;
  (b) bridge rectifier means connected across said secondary winding for supplying a full wave ripple signal; and
  (c) low pass filter means connected to said bridge rectifier means for low pass filtering said ripple signal to provide said third output signal.

13. The controller of claim 8, wherein said negative feedback means comprises:
  (a) a capacitor having a first side and a second side, said first side connected to said amplifying means for reducing the amplification thereof; and
  (b) a photosensitive resistor having an LED element and a light controlled resistor element having a first side and a second side, said LED element connected to said power supply means to receive said third output signal, said first side of said light controlled resistor element connected to said amplifying means to receive said second output signal, and said second side of said light controlled resistor element connected to said second side of said capacitor.

14. The controller of claim 8, further comprising biasing means connected between said power supply means and said coupling means for reducing the level of said first input signal as a function of an increase in the electric power provided to the motor during normal operation.

15. The controller of claim 8, further comprising:
  (a) rectifying and filtering means connected between said signal amplifying means and said coupling means for rectifying and filtering said second output signal prior to it being supplied to said coupling means.

16. The controller of claim 15, further comprising:
  (a) working-point adjusting and indicating means connected to said rectifying and filtering means for providing a visual indication of the level of said rectified and filtered second output signal.

17. The controller of claim 16, wherein working-point adjusting and indicating means comprises:
  (a) an LED having a first side and a second side, said first side connected to said power supply means to receive said third output signal; and
  (b) Darlington amplifier means, having an input connected to said rectifying and filtering means and having an output connected to said second side of said LED, for controlling the light generated by said LED in accordance with the level of said rectified and filtered second output signal.

18. The controller of claim 15, further comprising:
  (a) overload protecting means connected to said rectifying and filtering means and to said TRIAC for electrically bypassing said anode and said cathode when said rectified and filtered second output signal exceeds an over-current level.

19. The controller of claim 18, wherein said overload protecting means comprises:
  (a) amplifier means connected to said rectifying and filtering means for driving an output node to a low state when said rectified and filtered second output signal exceeds the over-current level;
  (b) relay means having a relay coil with a first side and a second side and having a pair of contacts in electrical connection when said relay coil is not energized, said first side connected to said power supply means to receive said third output signal;

(c) an LED having a first side and a second side, said first side connected to said power supply means to receive said third output signal;

(d) Darlington amplifier means, having an input connected to said output node of said amplifier means and having an output connected to said second side of said relay coil and to said second side of said LED, for effectively connecting said second side of said relay coil and said second side of said LED to electrical ground when said output node goes to said low state.

20. The controller of claim 18, further comprising:

(a) delay protecting means connected to said rectifying and filtering means and to said overload protecting means for causing said overload protecting means for causing said overload protecting means to electrically bypass said anode and said cathode of said TRIAC when said rectified and filtered second output signal is less than a predetermined threshold level.

21. The controller of claim 20, wherein said delay protecting means comprises:

(a) firt amplifier means, having an input connected to said rectifying and filtering means and having an output, for causing said output to be in a high state when said rectified and filtered second output signal is less than said threshold level; and (b) second amplifier means, having an input connected to said output of said first amplifier means and having an output connected to said overload protecting means, for causing said overload protecting means to electrically bypass said anode and said cathode of said TRIAC when said output of said first amplified is in said high state.

22. The controller of claim 21, wherein said first amplifier means further comprises capacitor means connected between said input and electrical ground to delay the change from a low state to said high state.

* * * * *